(12) United States Patent
Cheng et al.

(10) Patent No.: US 11,159,935 B2
(45) Date of Patent: Oct. 26, 2021

(54) RESOURCE SLICING ON A SIDELINK INTERFACE

(71) Applicant: QUALCOMM Incorporated, San Diego, CA (US)

(72) Inventors: Hong Cheng, Bridgewater, NJ (US); Sudhir Kumar Baghel, Hillsborough, NJ (US); Shailesh Patil, San Diego, CA (US); Michaela Vanderveen, Tracy, CA (US); Junyi Li, Chester, NJ (US); Zhibin Wu, Sunnyvale, CA (US); Kapil Gulati, Dover, DE (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/365,329

(22) Filed: Mar. 26, 2019

(65) Prior Publication Data

US 2019/0357033 A1 Nov. 21, 2019

Related U.S. Application Data

(60) Provisional application No. 62/672,279, filed on May 16, 2018.

(51) Int. Cl.
*H04W 8/18* (2009.01)
*H04W 4/40* (2018.01)
(Continued)

(52) U.S. Cl.
CPC ............... *H04W 8/18* (2013.01); *H04W 4/40* (2018.02); *H04W 72/04* (2013.01); *H04W 76/27* (2018.02); *H04W 88/02* (2013.01)

(58) Field of Classification Search
CPC . H04W 72/0406; H04W 72/04; H04W 76/27; H04W 76/18; H04W 8/18; H04W 4/40
See application file for complete search history.

(56) References Cited

U.S. PATENT DOCUMENTS

| 10,999,740 B2* | 5/2021 | Xu ........................ H04W 16/10 |
| 2016/0381720 A1* | 12/2016 | Baek ...................... H04W 8/14 |
| | | 370/329 |

(Continued)

FOREIGN PATENT DOCUMENTS

WO 2018175553 A1 9/2018

OTHER PUBLICATIONS

Apostolos K , et al., "Recent Advances in 3GPP Networks for Vehicular Communications," 2017 IEEE Conference an Standards for Communications and Networking (CSCN), IEEE, Sep. 18, 2017, pp. 91-97, XP033241324, DOI 10.1109/CSCN.2017.8088604 [retrieved on Oct. 27, 2017] Chapter I. Introduction, Chapter II.B. Enhancement of 3GPP Support for V2X Scenarios—3GPP Rlease 15, Chapter III. V2X Architecture, Chapter IV. V2X Sidelink Communication, figure 4.

(Continued)

*Primary Examiner* — Redentor Pasia
(74) *Attorney, Agent, or Firm* — Harrity & Harrity, LLP

(57) ABSTRACT

Various aspects of the present disclosure generally relate to wireless communication. In some aspects, a user equipment (UE) may determine a service type to be used by the UE for one or more device-to-device (D2D) communications on a sidelink interface; determine a slice identifier based at least in part on the service type, wherein the slice identifier corresponds to a resource allocation to be used for the one or more D2D communications; and transmit an indication of the slice identifier. Numerous other aspects are provided.

30 Claims, 8 Drawing Sheets

(51) Int. Cl.
*H04W 76/27* (2018.01)
*H04W 72/04* (2009.01)
*H04W 88/02* (2009.01)

(56) References Cited

U.S. PATENT DOCUMENTS

| | | | | |
|---|---|---|---|---|
| 2017/0295531 | A1* | 10/2017 | Singh | H04W 8/08 |
| 2017/0311304 | A1* | 10/2017 | Lu | H04N 21/4131 |
| 2017/0367036 | A1* | 12/2017 | Chen | H04L 43/08 |
| 2018/0049099 | A1* | 2/2018 | Lee | H04W 40/12 |
| 2018/0054237 | A1* | 2/2018 | Tseng | H04W 72/085 |
| 2018/0070371 | A1* | 3/2018 | Shin | H04L 5/00 |
| 2018/0220356 | A1* | 8/2018 | Tenny | H04W 48/02 |
| 2018/0227736 | A1* | 8/2018 | Lee | H04W 36/08 |
| 2018/0249455 | A1* | 8/2018 | Jung | H04W 48/08 |
| 2018/0343556 | A1* | 11/2018 | Wang | H04W 72/0486 |
| 2018/0368090 | A1* | 12/2018 | Kadambar | H04W 76/14 |
| 2019/0230584 | A1* | 7/2019 | Lou | H04W 74/0833 |
| 2020/0008030 | A1* | 1/2020 | Kim | H04W 4/70 |
| 2020/0022193 | A1* | 1/2020 | Ma | H04W 4/06 |

OTHER PUBLICATIONS

International Search Report and Written Opinion—PCT/US2019/024403—ISA/EPO—dated May 27, 2019.

* cited by examiner

RESOURCE SLICING ON A SIDELINK INTERFACE

CROSS-REFERENCE TO RELATED APPLICATIONS UNDER 35 U.S.C. § 119

This application claims priority to U.S. Provisional Patent Application No. 62/672,279, filed on May 16, 2018, entitled "TECHNIQUES AND APPARATUSES FOR RESOURCE SLICING ON A SIDELINK INTERFACE," which is hereby expressly incorporated by reference herein.

FIELD OF THE DISCLOSURE

Aspects of the present disclosure generally relate to wireless communication, and more particularly to techniques and apparatuses for resource slicing on a sidelink interface.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a UE, may include determining a service type to be used by the UE for one or device-to-device (D2D) communications on a sidelink interface; determining a slice identifier based at least in part on the service type, wherein the slice identifier corresponds to a resource allocation to be used for the one or more D2D communications; and transmitting an indication of the slice identifier.

In some aspects, a UE for wireless communication may include memory and one or more processors operatively coupled to the memory. The memory and the one or more processors may be configured to determine a service type to be used by the UE for one or more D2D communications on a sidelink interface; determine a slice identifier based at least in part on the service type, wherein the slice identifier corresponds to a resource allocation to be used for the one or more D2D communications; and transmit an indication of the slice identifier.

In some aspects, a non-transitory computer-readable medium may store one or more instructions for wireless communication. The one or more instructions, when executed by one or more processors of a UE, may cause the one or more processors to determine a service type to be used by the UE for one or more D2D communications on a sidelink interface; determine a slice identifier based at least in part on the service type, wherein the slice identifier corresponds to a resource allocation to be used for the one or more D2D communications; and transmit an indication of the slice identifier.

In some aspects, an apparatus for wireless communication may include means for determining a service type to be used by the apparatus for one or more D2D communications on a sidelink interface; means for determining a slice identifier based at least in part on the service type, wherein the slice identifier corresponds to a resource allocation to be used for the one or more D2D communications; and means for transmitting an indication of the slice identifier.

In some aspects, a method of wireless communication, performed by a first UE, may include receiving an indication of a slice identifier that identifies a slice type to be used by a second UE, wherein the slice identifier corresponds to a service type and a resource allocation to be used for one or more D2D communications of the second UE on a sidelink interface; determining the resource allocation based at least in part on the slice identifier; and preventing the first UE from using resources indicated by the resource allocation for transmission of communications not associated with the service type.

In some aspects, a first UE for wireless communication may include memory and one or more processors operatively coupled to the memory. The memory and the one or more processors may be configured to receive an indication of a slice identifier that identifies a slice type to be used by a second UE, wherein the slice identifier corresponds to a service type and a resource allocation to be used for one or more D2D communications of the second UE on a sidelink interface; determine the resource allocation based at least in part on the slice identifier; and prevent the first UE from using resources indicated by the resource allocation for transmission of communications not associated with the service type.

In some aspects, a non-transitory computer-readable medium may store one or more instructions for wireless communication. The one or more instructions, when executed by one or more processors of a first UE, may cause the one or more processors to receive an indication of a slice identifier that identifies a slice type to be used by a second UE, wherein the slice identifier corresponds to a service type and a resource allocation to be used for one or more D2D communications of the second UE on a sidelink interface; determine the resource allocation based at least in part on the slice identifier; and prevent the first UE from using resources indicated by the resource allocation for transmission of communications not associated with the service type.

In some aspects, a first apparatus for wireless communication may include means for receiving an indication of a slice identifier that identifies a slice type to be used by a second apparatus, wherein the slice identifier corresponds to a service type and a resource allocation to be used for one or more D2D communications of the second apparatus on a sidelink interface; means for determining the resource allocation based at least in part on the slice identifier; and means for preventing the first apparatus from using resources indicated by the resource allocation for transmission of communications not associated with the service type.

In some aspects, a method of wireless communication, performed by a base station, may include receiving an indication of a slice identifier that identifies a slice type to be used by a UE, wherein the slice identifier corresponds to a service type and a resource allocation to be used for one or D2D communications of the UE on a sidelink interface; and indicating at least one of the slice identifier or the resource allocation to one or more UEs in a coverage area of the base station.

In some aspects, a base station for wireless communication may include memory and one or more processors operatively coupled to the memory. The memory and the one or more processors may be configured to receive an indication of a slice identifier that identifies a slice type to be used by a UE, wherein the slice identifier corresponds to a service type and a resource allocation to be used for one or more D2D communications of the UE on a sidelink interface; and indicate at least one of the slice identifier or the resource allocation to one or more UEs in a coverage area of the base station.

In some aspects, a non-transitory computer-readable medium may store one or more instructions for wireless communication. The one or more instructions, when executed by one or more processors of a base station, may cause the one or more processors to receive an indication of a slice identifier that identifies a slice type to be used by a UE, wherein the slice identifier corresponds to a service type and a resource allocation to be used for one or more D2D communications of the UE on a sidelink interface; and indicate at least one of the slice identifier or the resource allocation to one or more UEs in a coverage area of the base station.

In some aspects, an apparatus for wireless communication may include means for receiving an indication of a slice identifier that identifies a slice type to be used by a UE, wherein the slice identifier corresponds to a service type and a resource allocation to be used for one or more D2D communications of the UE on a sidelink interface; and means for indicating at least one of the slice identifier or the resource allocation to one or more UEs in a coverage area of the apparatus.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
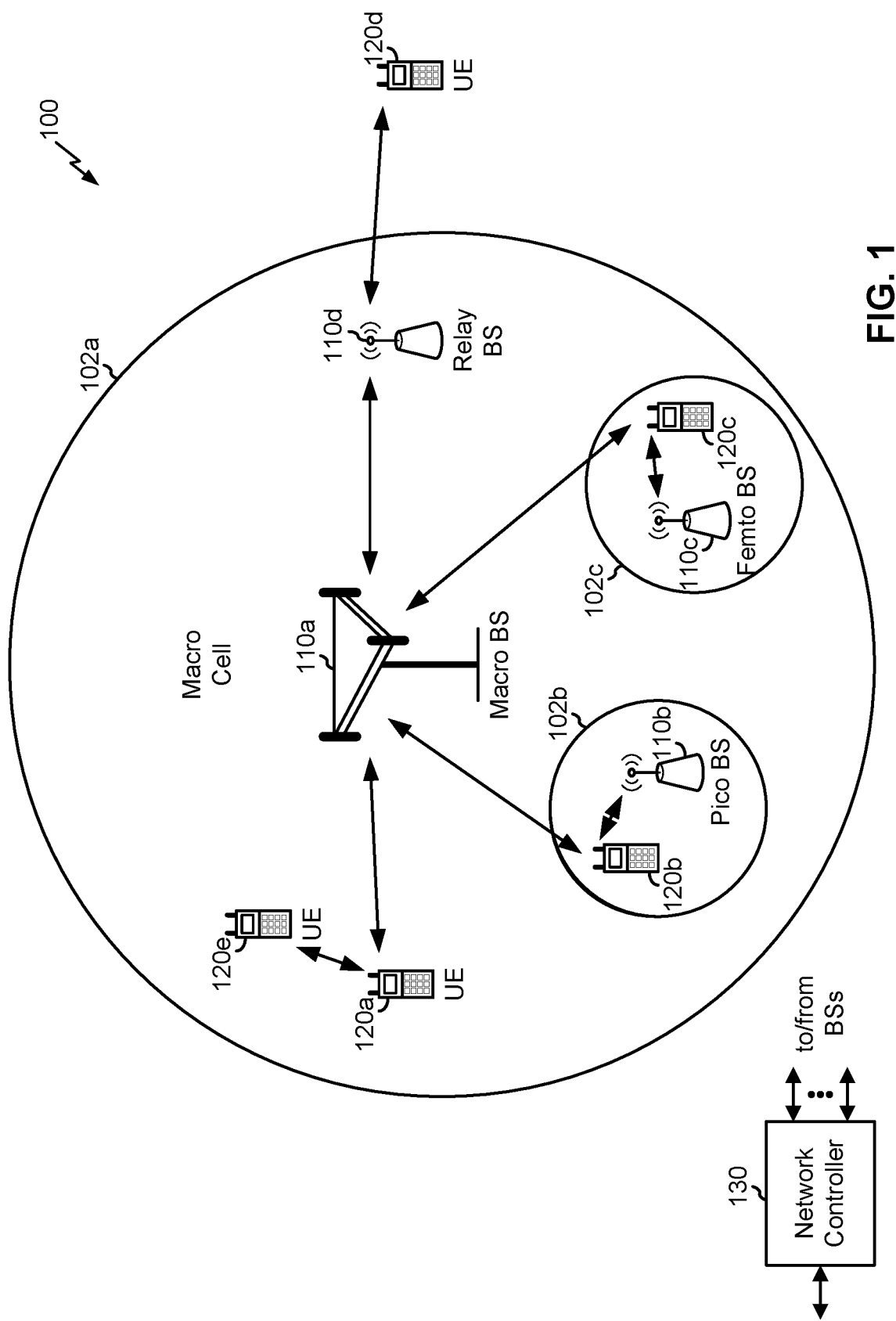
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another), such as via a sidelink interface (e.g., a PC5 interface) and/or the like. For example, the UEs 120 may communicate using device-to-device communications, which may include peer-to-peer (P2P) communications, communications using a vehicle-to-everything (V2X) protocol (e.g., which may include a vehicle-to-vehicle (V2V) protocol, a vehicle-to-infrastructure (V2I) protocol, and/or the like), and/or the like. In this case, the UE 120 may perform scheduling operations, resource selection operations, and/or other operations described elsewhere herein as being performed by the base station 110.

As indicated above, FIG. 1 is provided merely as an example. Other examples may differ from what is described with regard to FIG. 1.

Figure 2:
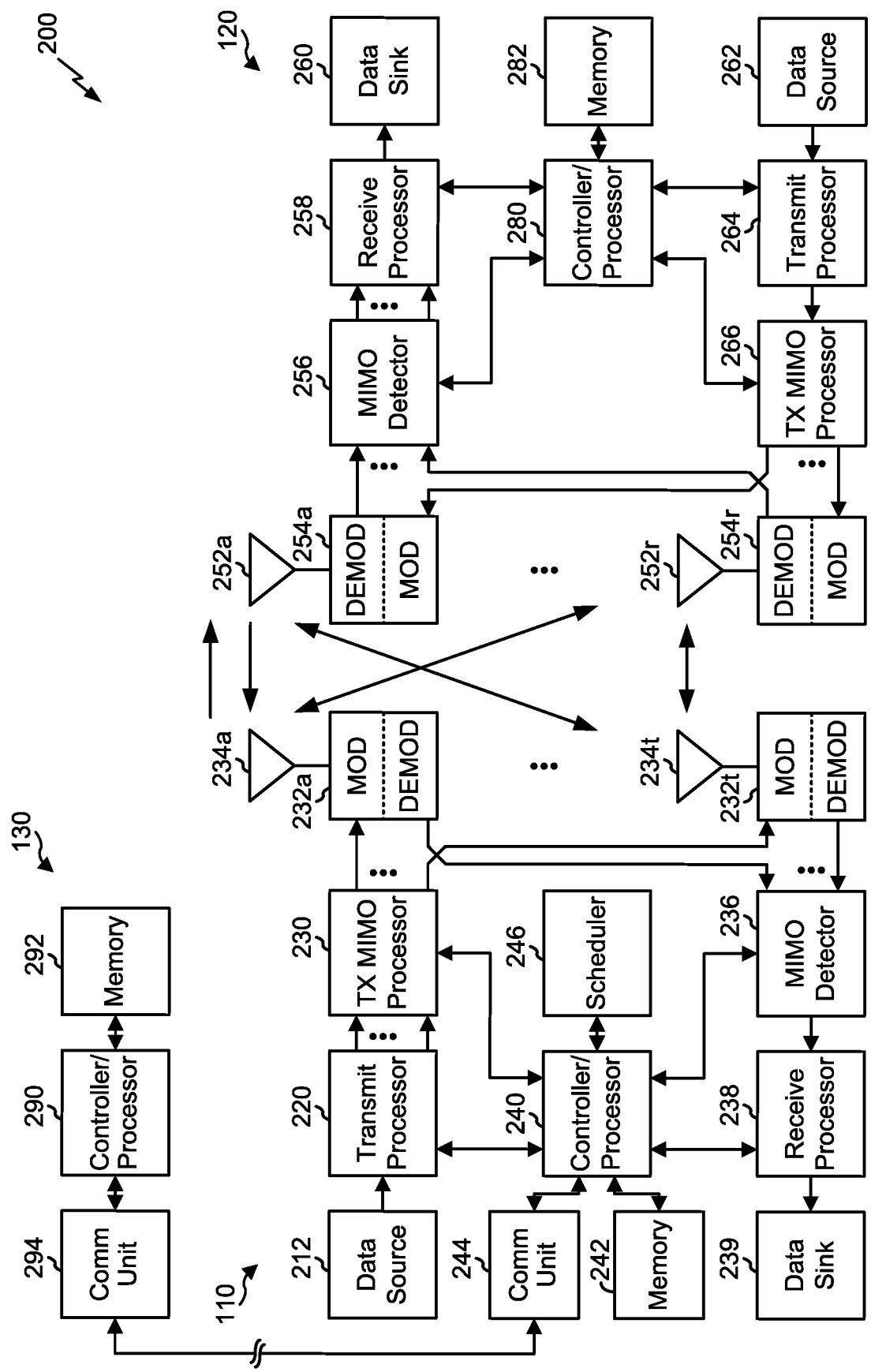
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

In some aspects, one or more components of UE 120 may be included in a housing. Controller/processor 240 of base station 110, controller/processor 280 of UE 120, and/or any other component(s) of FIG. 2 may perform one or more techniques associated with resource slicing on a sidelink interface, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, process 800 of FIG. 8, and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for determining a service type to be used by the UE 120 for one or more D2D communications on a sidelink interface; means for determining a slice identifier based at least in part on the service type, wherein the slice identifier corresponds to a resource allocation to be used for the one or more D2D communications; means for transmitting an indication of the slice identifier; and/or the like. Additionally, or alternatively, a first UE 120 may include means for receiving an indication of a slice identifier that identifies a slice type to be used by a second UE 120, wherein the slice identifier corresponds to a service type and a resource allocation to be used for one or more D2D communications of the second UE 120 on a sidelink interface; means for determining the resource allocation based at least in part on the slice identifier; means for preventing the first UE 120 from using resources indicated by the resource allocation for transmission of communications not associated with the service type; and/or the like. In some aspects, such means may include one or more components of UE 120 described in connection with FIG. 2.

In some aspects, base station 110 may include means for receiving an indication of a slice identifier that identifies a slice type to be used by a UE, wherein the slice identifier corresponds to a service type and a resource allocation to be used for one or more D2D communications of the UE on a sidelink interface; means for indicating at least one of the slice identifier or the resource allocation to one or more UEs in a coverage area of the base station 110; and/or the like. In some aspects, such means may include one or more components of base station 110 described in connection with FIG. 2.

As indicated above, FIG. 2 is provided merely as an example. Other examples may differ from what is described with regard to FIG. 2.

Figure 3:
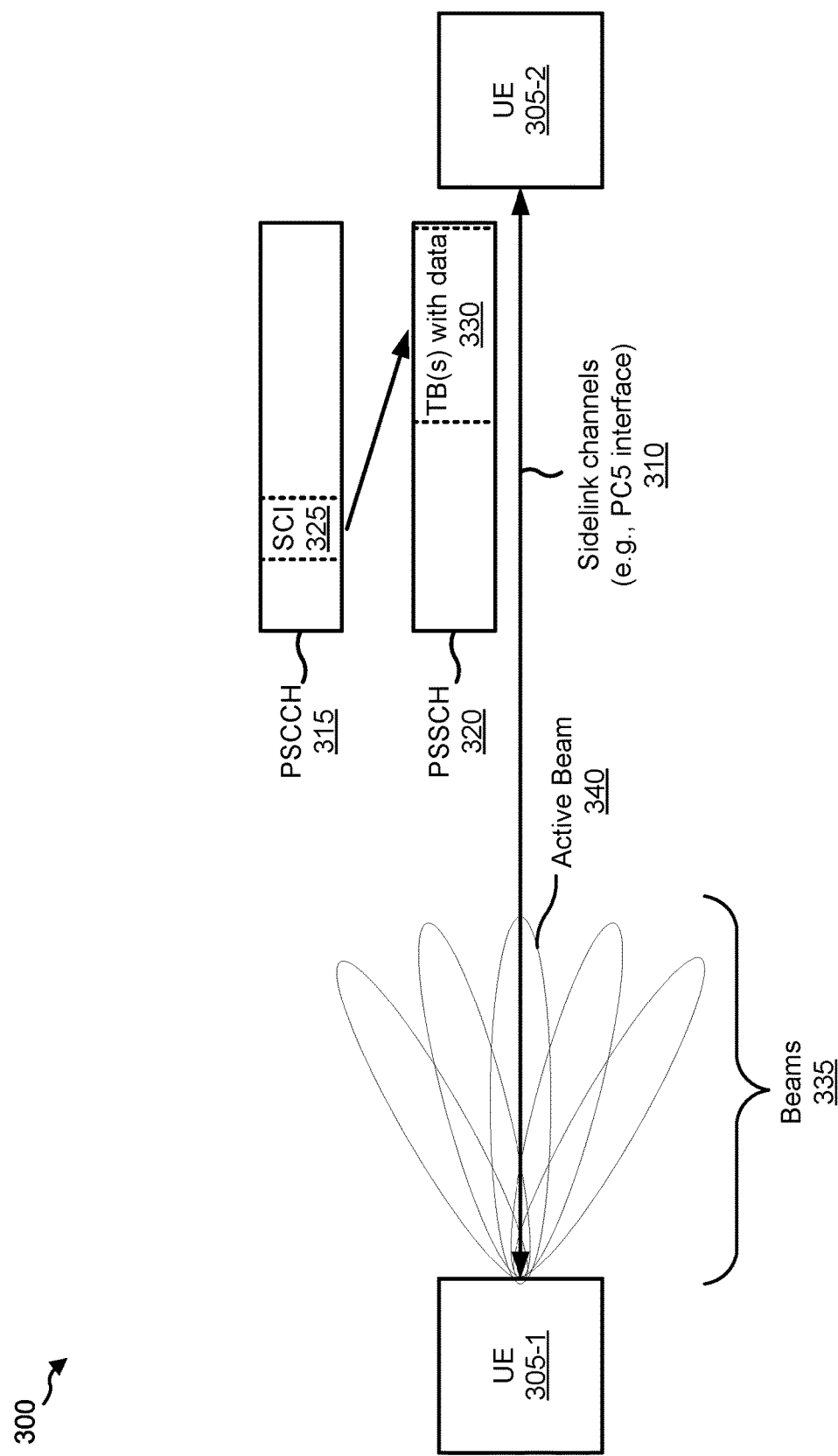
FIG. 3 is a diagram illustrating an example of device-to-device (D2D) communications on a sidelink interface, in accordance with various aspects of the present disclosure.

FIG. 3 is a diagram illustrating an example 300 of D2D communications on a sidelink interface, in accordance with various aspects of the present disclosure.

As shown in FIG. 3, a first UE 305-1 may communicate with a second UE 305-2 (and one or more other UEs 305) using device-to-device (D2D) communications via one or more sidelink channels 310. In some aspects, the UEs 305 may correspond to one or more other UEs described elsewhere herein, such as UE 120 and/or the like. In some aspects, a sidelink channel 310 may use a sidelink interface, such as a PC5 interface, and/or may operate in a high frequency band (e.g., the 5.9 GHz band). Additionally, or alternatively, the UEs 305 may synchronize timing of transmission time intervals (e.g., frames, subframes, slots, and/or the like) using global navigation satellite system (GNSS) timing. The UEs 305 may transmit D2D communications, such as V2X communications and/or the like, using the sidelink channel 310.

In some aspects, D2D transmissions may be one-to-many broadcast and/or multicast transmissions. In some aspects, D2D transmissions may not require any physical layer feedback from receiving devices, such as acknowledgement (ACK) or negative acknowledgement (NACK) feedback. In some aspects, D2D transmissions may be configured without retransmission. In some aspects, D2D transmissions may be configured with a small number of retransmissions (e.g., one retransmission) that always occur (e.g., without ACK/NACK feedback).

As further shown in FIG. 3, the sidelink channel 310 may include a physical sidelink control channel (PSCCH) 315 and a physical sidelink shared channel (PSSCH) 320. The PSCCH 315 may be used to communicate control information, similar to a physical downlink control channel (PDCCH) and/or a physical uplink control channel (PUCCH) used for communications with a base station 110. The PSSCH 320 may be used to communicate data, similar to a physical downlink shared channel (PDSCH) and/or a physical uplink shared channel (PUSCH) used for communications with a base station 110. For example, the PSCCH 315 may carry sidelink control information (SCI) 325, which may indicate various control information used for sidelink communications, such as one or more resources (e.g., time, frequency, and/or beam resources) where a transport block (TB) 330 that includes data is carried on the PSSCH 320 and/or other control information that may be used to assist in receiving, decoding, and/or demodulating data carried via the PSSCH 320. The TB 330 may include D2D data and/or V2X data, such as a basic safety message (BSM), a traffic information message (TIM), a signal phase and time (SPAT) message, a MAP message to convey geographic road information, a cooperative awareness message (CAM), a distributed environment notification message (DENM), an in-vehicle information (IVI) message, and/or the like. In some aspects, the V2X data may include data relevant to operation of a vehicle associated with a UE 305.

In some aspects, the sidelink channel 310 may use resource pools. For example, a scheduling assignment (e.g., included in SCI 325) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using transmission mode 3, where resource selection and/or scheduling is performed by a base station 110. In some aspects, a UE 305 may operate using transmission mode 4, where resource selection and/or scheduling is performed by the UE 305 (e.g., rather than a base station 110). In some aspects, the UE 305 may perform resource selection and/or scheduling by sensing channel availability for transmissions. For example, the UE 305 may measure a received signal strength indicator (RSSI) parameter (e.g., a sidelink-RSSI (S-RSSI) parameter) associated with various sidelink channels, may measure a reference signal received power (RSRP) parameter (e.g., a PSSCH-RSRP parameter) associated with various sidelink channels, may measure a reference signal received quality (RSRQ) parameter (e.g., a PSSCH-RSRQ parameter) associated with various sidelink channels, and/or the like, and may select a channel for transmission of D2D communications based at least in part on the measurement(s).

Additionally, or alternatively, the UE 305 may perform resource selection and/or scheduling using SCI 325 received in the PSCCH 315, which may indicate occupied resources, channel parameters, and/or the like. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a particular set of subframes).

As further shown in FIG. 3, a UE 305 may communicate with other UEs 305 using one or more beams 335. For example, the UEs 305 may include multiple antenna elements to support beamforming using millimeter wave beams 335 in the millimeter wave frequency band. In some aspects, the UE 305 may support and/or dynamically configure different beam widths for a beam 335, which may change the range of the beam 335 (e.g., a wider beam with a shorter range or a narrower beam with a longer range). A millimeter wave beam 335 may be capable of higher throughput than a sub-6 GHz transmission, which may be useful for D2D and/or V2X communications (e.g., to transmit camera feeds and/or the like). As shown, the first UE 305-1 may communicate with the second UE 305-2 using an active beam 340.

In some aspects, the first UE 305-1 may communicate with one or more other UEs 305 using one or more other beams 335.

When UEs 305 communicate on the sidelink channel 310 (e.g., on a PC5 interface), the UEs 305 may select resources for D2D communications from a large pool of preconfigured resources (e.g., time resources and/or frequency resources). These preconfigured resources may be statically configured based at least in part on a UE configuration or a network configuration (e.g., signaled by a base station 110). In this configuration, the same pool of resources may be used for a wide variety of service types. However, different service types may have different characteristics, such as different resource requirements, different reliability requirements, different latency requirements, different quality of service requirements, different transmission characteristics, and/or the like. As a result, performance may be improved by using different resource allocation, handling, and management strategies for different service types, which may be difficult when the same pool of resources are allocated to all service types.

Some techniques and apparatuses described herein permit slicing of resources on a sidelink interface and/or a sidelink channel 310. For example, resources (e.g., time resources, frequency resources, and/or the like) allocated for sidelink communications on the sidelink interface may be statically or dynamically allocated or reallocated for different service types. With static resource slicing, resource slices of differing quantities of resources may be allocated to different service types depending on resource requirements and/or other requirements of the different service types, thereby improving performance via more effective and efficient allocation of resources. With dynamic resource slicing, resource slices can be created, removed, or modified dynamically depending on whether different service types are being used in different coverage areas and/or within the vicinity of UEs 120 communicating using D2D communications. Additional details are described below.

As indicated above, FIG. 3 is provided merely as an example. Other examples may differ from what is described with regard to FIG. 3.

Figure 4:
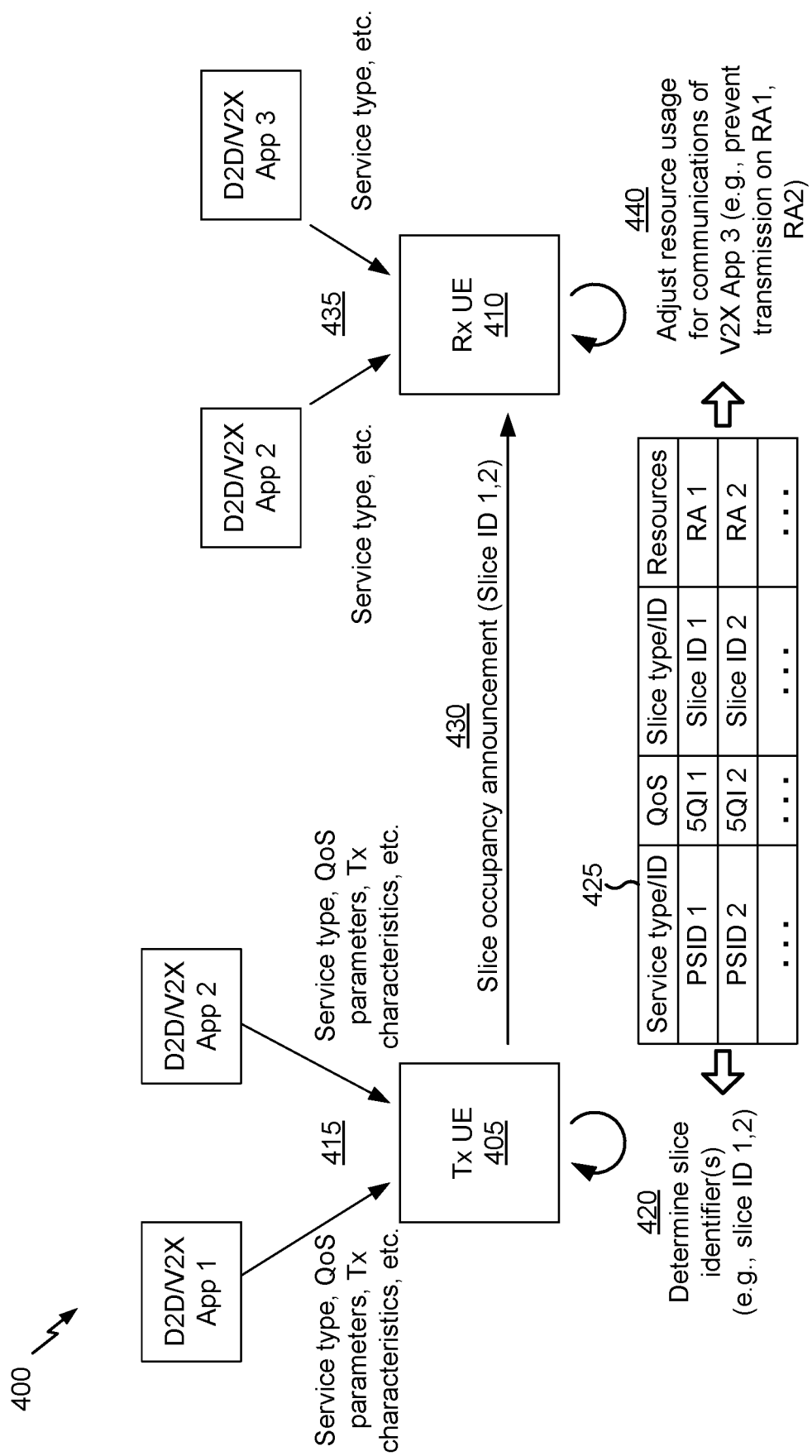
FIGS. 4 and 5 are diagrams illustrating examples of resource slicing on a sidelink interface, in accordance with various aspects of the present disclosure.

FIG. 4 is a diagram illustrating an example 400 of resource slicing on a sidelink interface, in accordance with various aspects of the present disclosure.

As shown in FIG. 4, a transmitter (Tx) UE 405 may communicate with a receiver (Rx) UE 410. The transmitter UE 405 and/or the receiver UE 410 may correspond to one or more UEs described elsewhere herein, such as UE 120, UE 305, and/or the like. In some aspects, a UE 405, 410 may be integrated into a vehicle, may be located in or on the vehicle, and/or the like. A vehicle may include an autonomous vehicle, a semi-autonomous vehicle, a non-autonomous vehicle, and/or the like. Additionally, or alternatively, one or more of the UEs 405, 410 may not be associated with a vehicle. For example, a UE 405, 410 may be associated with infrastructure (e.g., traffic infrastructure, such as a traffic signal, a lane signal, a sensor, a traffic controller system, and/or the like), a pedestrian (e.g., via a wearable device), and/or the like.

The transmitter UE 405 and the receiver UE 410 may communicate via one or more sidelink channels 310 (e.g., to exchange SCI 325 and corresponding TBs 330), as described above in connection with FIG. 3. As used herein, the term transmitter (Tx) UE 405 is used to describe a UE that schedules transmission of a particular D2D communication and/or transmits the particular D2D communication to a receiver UE 410. As used herein, the term receiver (Rx) UE 410 is used to describe a UE that receives the particular D2D communication from the transmitter UE 405. A single UE (e.g., UE 120) may be capable of operating as a transmitter UE 405 (e.g., that transmits D2D communications to other UEs) and a receiver UE 410 (e.g., that receives D2D communications from other UEs).

As shown by reference number 415, the Tx UE 405 may determine a service type to be used by the Tx UE 405 for one or more D2D communications on a sidelink interface, such as a PC5 interface and/or the like. For example, as shown, the Tx UE 405 may determine the service type based at least in part on information received from a D2D application executing on the Tx UE 405. In some aspects, a D2D application may provide information identifying a service type of the application, one or more quality of service (QoS) parameters associated with the application and/or the service type, one or more transmission characteristics associated with the application and/or the service type, and/or the like. In some aspects, if the Tx UE 405 is executing multiple D2D applications (e.g., V2X applications and/or the like), the Tx UE 405 may receive and/or determine such information for each of the D2D applications.

A service type may indicate a type of D2D service (e.g., a V2X service and/or the like) associated with the D2D application, such as a location-based service, an intersection assist service, a platooning service (e.g., where one or more trailing vehicles or trailing UEs follow a lead vehicle or lead UE), a cooperative adaptive cruise control (CACC) service, a sensor sharing service (e.g., where sensor information measured by one UE is shared with one or more other UEs), and/or the like.

A quality of service parameter may include, for example, a packet loss rate requirement, a packet error rate requirement, a bit rate requirement, a throughput requirement, a latency requirement, a reliability requirement, an availability requirement, a jitter requirement, and/or the like. In some aspects, a set of quality of service parameters may be indicated by a QoS class identifier (QCI), 5G QoS identifier (5QI) value, and/or the like.

A transmission characteristic may include, for example, a maximum transmit power, a set of supported modulation and coding schemes (MCS), a hybrid automatic repeat request (HARD) configuration (e.g., for repetitions, acknowledgement (ACK) or negative acknowledgement (NACK) feedback, and/or the like), a carrier aggregation configuration, a transmission diversity characteristic (e.g., for time hopping, frequency hopping, repetitions, and/or the like), and/or the like.

As shown by reference number 420, the Tx UE 405 may determine a slice identifier based at least in part on the service type. The slice identifier may indicate a slice type, and/or may correspond to a resource allocation to be used for the one or more D2D communications. Additionally, or alternatively, the slice identifier may indicate a sub-slice type if a particular service type has multiple sub-service types. For example, a platooning service type may have sub-service types of basic platooning and advanced platooning, which may be associated with different requirements. Additionally, or alternatively, the slice identifier may indicate a slice instance if the service type could be associated with multiple slices (e.g., to subdivide resources for different Tx UEs 405). For example, different slice instances can be assigned to different platoon groups based on the platoon leaders' identities.

As shown by reference number 425, in some aspects, the Tx UE 405 may determine the slice identifier using a data structure (e.g., a table, a linked list, and/or the like, which may be stored in memory of the Tx UE 405) that maps different service type identifiers to corresponding slice identifiers. For example, the Tx UE 405 may determine a service type identifier that identifies a service type of a D2D application being used by the Tx UE 405. The service type identifier may include, for example, an upper layer identifier (e.g., an application layer identifier), a provider service identifier (PSID), an intelligent transport system application identifier (ITS-AID), an identifier that is not readable at an access stratum (AS) layer, and/or the like. The service type identifier may map to a slice identifier, which may be readable at the AS layer. In this way, the service type identifier, which is not readable at the AS layer, may be translated into a slice identifier, which is readable at the AS layer.

Additionally, or alternatively, the Tx UE 405 may determine the slice identifier based at least in part on a set of quality of service parameters associated with the service type and/or the D2D application. For example, the Tx UE 405 may store a data structure that maps different sets of QoS parameters (e.g., represented by QCI values, shown as 5QI for a 5G network) to corresponding slice identifiers. In some aspects, and as shown, the Tx UE 405 may determine the slice identifier based at least in part on a service type and a set of QoS parameters. For example, a first service type identifier of "PSID 1" and a first set of QoS parameters represented as "5QI 1" may correspond to a first slice identifier of "Slice ID 1," a second service type identifier of "PSID 2" and a second set of QoS parameters represented as "5QI 2" may correspond to a second slice identifier of "Slice ID 2," and/or the like. In example 400, the Tx UE 405 may determine that a first D2D and/or V2X application (e.g., D2D/V2X App 1) is associated with a first slice identifier of "Slice ID 1," and may determine that a second D2D and/or V2X application (e.g., D2D/V2X App 2) is associated with a second slice identifier of "Slice ID 2."

As further shown, a slice identifier may correspond to a resource allocation (shown as "RA") to be used for D2D communications associated with a service type and/or a set of QoS parameters represented by the slice identifier. The resource allocation may indicate a set of resources (e.g., time resources, frequency resources, resource blocks, and/or the like) to be used for those D2D communications. In some aspects, the Tx UE 405 may determine the resource allocation based at least in part on the slice identifier, such as by looking up the resource allocation in a data structure that maps different resource allocations to corresponding slice identifiers. The Tx UE 405 may transmit D2D communications, associated with a slice identifier, on a set of resources of a resource allocation associated with the slice identifier. For example, the Tx UE 405 may select resources and/or schedule resources of the resource allocation for transmission of the D2D communications associated with the slice identifier.

In some aspects, one or more data structures described herein may be pre-configured for a UE and/or a base station. For example, information stored in a data structure may be hard coded in memory according to a standard. Additionally, or alternatively, one or more data structures described herein may be provisioned for a UE (e.g., using a subscriber identity module (SIM) of the UE) and/or a base station. For example, information for a data structure may be provisioned based at least in part on a network configuration, such as a public land mobile network (PLMN) configuration for a PLMN being used by the UE and/or the base station. Additionally, or alternatively, one or more data structures described herein may be dynamically configured for a UE based at least in part on an indication received from a base station. For example, the base station may indication information to be stored in the data structure using a signaling message, such as a non-access stratum (NAS) message, a radio resource control (RRC) message, an Open Mobile Alliance (OMA) Device Management (DM) message, and/or the like.

In example 400, the Tx UE 405 may determine that a first resource allocation (e.g., RA 1) is associated with a first slice identifier of "Slice ID 1," and may determine that a second resource allocation (e.g., RA 2) is associated with a second slice identifier of "Slice ID 2." In this case, the Tx UE 405 may transmit or receive (e.g., monitor for) D2D communications associated with the first D2D and/or V2X application (D2D/V2X App 1) on resources selected from the first resource allocation, and may transmit or receive D2D communications associated with the second D2D and/or V2X application (D2D/V2X App 2) on resources selected from the second resource allocation. In this way, D2D and/or V2X applications having different requirements can use different resource allocations, which may be configured according to one or more requirements of a corresponding D2D and/or V2X application to improve performance.

In some aspects, the Tx UE 405 may determine the resource allocation based at least in part on an indication received from a base station 110. For example, the base station 110 may indicate, to the Tx UE 405, information to be used to populate the data structure. In some aspects, this information may be transmitted by the base station 110 based at least in part on receiving an indication of one or more slice identifiers transmitted to the base station 110 by the Tx UE 405 (e.g., in a slice occupancy announcement, as described below). In some aspects, the base station 110 may indicate all resource allocations for all slice types supported by the base station 110, which may reduce latency if the Tx UE 405 needs to communicate using a new service not indicated to the base station 110. Alternatively, the base station 110 may indicate only resource allocations corresponding to slice identifiers transmitted to the base station 110 by the Tx UE 405. In this way, network resources may be conserved. In either case, the indication of resource allocation(s) may be indicated in an RRC message, a system information block (SIB), and/or the like.

As shown by reference number 430, the Tx UE 405 may transmit, and the Rx UE 410 may receive, an indication of the slice identifier. For example, in some aspects, the Tx UE 405 may transmit the indication of the slice identifier in a slice occupancy announcement to indicate that D2D communications of the Tx UE 405 are to occupy a particular slice of time and/or frequency resources. As described above, in some aspects, the slice identifier may indicate a slice type, a sub-slice type, and/or a slice instance (e.g., depending on a granularity of a service type associated with the slice identifier and/or a granularity of resource allocations associated with the service type).

Additionally, or alternatively, the Tx UE 405 may indicate a requested duration for use of a slice (e.g., a resource allocation) identified by the slice identifier. For example, the Tx UE 405 may indicate a time period or a length of time for which a resource allocation, associated with the slice identifier, is to be used. In some aspects, an Rx UE 410 and/or a base station 110 may use this information to make scheduling decisions. Additionally, or alternatively, the Tx UE 405 may indicate a requested slice size (e.g., corresponding to a number of resources included in the resource allocation) for the slice. In some aspects, an Rx UE 410 and/or a base station 110 may use this information for dynamic resource slicing, where a slice identifier may be associated with multiple possible resource allocations having different sizes, and the size of the resource allocation to be used may be determined based at least in part on the requested slice size.

Additionally, or alternatively, the Tx UE 405 may indicate a location of the Tx UE 405, a speed of the Tx UE 405, an acceleration of the Tx UE 405, a trajectory of the Tx UE 405, and/or the like. This information may be used by an Rx UE 410 and/or a base station 110 to estimate a duration of time for which the Tx UE 405 will use the slice identified by the slice identifier.

Additionally, or alternatively, the Tx UE 405 may indicate (e.g., via the slice identifier) a QoS migration path. The QoS migration path may include, for example, a permitted quality of service upgrade (e.g., to a better QoS), a permitted quality of service downgrade (e.g., to a worse QoS), and/or the like. In this way, a QoS level may be dynamically adjusted based at least in part on, for example, network conditions. The QoS migration path may be explicitly indicated, or may be implicitly indicated using the slice identifier.

Additionally, or alternatively, the Tx UE 405 may indicate (e.g., via the slice identifier) a capability of the Tx UE 405. The capability may include, for example, a maximum transmission power of the Tx UE 405, a modulation capability of the Tx UE 405, a transmit diversity capability of the Tx UE 405, a carrier aggregation capability of the Tx UE 405, and/or the like. In some aspects, the capability may be implicitly indicated using the slice identifier (e.g., because certain service types may require certain capabilities), and another device (e.g., an Rx UE 410, a base station 110, and/or the like) may communicate with the Tx UE 405 based at least in part on the implicit indication of the capability. In this way, network resources may be conserved as compared to explicitly indicating the capability.

In some aspects, the Tx UE 405 may transmit the indication of the slice identifier, and/or the related information described above (e.g., to an Rx UE 410), in a non-access stratum (NAS) message over a sidelink interface (e.g., a PC5 interface), in an RRC message to another UE (e.g., Rx UE 410), in a header of a D2D communication (e.g., a media access control (MAC) header, a radio link control (RLC) header, a packet data convergence protocol (PDCP) header, and/or the like), and/or the like. Additionally, or alternatively, the Tx UE 405 may transmit the indication of the slice identifier (e.g., to a base station 110) in an RRC message to the base station 110.

As shown in FIG. 4, in some aspects, the Tx UE 405 may indicate multiple slice identifiers in a slice occupancy announcement, such as if the Tx UE 405 is using multiple slices or expecting to use multiple slices within a threshold time period. In some aspects, if the Tx UE 405 is using only a single slice (e.g., associated with a single service type), then the Tx UE 405 may indicate a single slice identifier.

As shown by reference number 435, the Rx UE 410 may determine a service type to be used by the Rx UE 410 for one or more D2D communications on a sidelink interface, one or more QoS parameters associated with a D2D application and/or the service type, one or more transmission characteristics associated with the application and/or the service type, and/or the like, in a similar manner as described above in connection with the Tx UE 405. The Rx UE 410 may use this information to schedule D2D communications associated with D2D applications executing on the Rx UE 410 and/or to adjust resource usage for such D2D communications, as described below.

As shown by reference number 440, the Rx UE 410 may adjust resource usage of the Rx UE 410 based at least in part on the indication of the slice identifier received from the Tx UE 405. For example, the Rx UE 410 may determine one or more resource allocations corresponding to one or more slice identifiers received from the Tx UE 410 (and/or one or more other Tx UEs 410), and may adjust resource usage associated with those resource allocations. For example, the Rx UE 410 may receive a first slice identifier, may determine a resource allocation corresponding to the first slice identifier, and may determine whether the Rx UE 410 has scheduled communications on resources of the resource allocation for a service type that does not correspond to the first slice identifier. In this case, the Rx UE 410 may reschedule those communications to not occupy the resource allocation. Additionally, or alternatively, the Rx UE 410 may prevent communications not associated with a service type corresponding to the first slice identifier from being scheduled on resources of the resource allocation. In this way, the resource allocation may be dynamically configured for a service type not previously being used in the vicinity of the Rx UE 410.

In example 400, the Rx UE 410 may be executing a third D2D and/or V2X application (e.g., D2D/V2X App 3) associated with a third service type that corresponds to a third slice identifier that is different from the first slice identifier and the second slice identifier. In this case, the Rx UE 410 may identify a first resource allocation corresponding to the first slice identifier, may identify a second resource allocation corresponding to the second slice identifier, and may prevent D2D communications of the third D2D and/or V2X application from being scheduled and/or transmitted using resources of the first resource allocation and resources of the second resource allocation.

In some aspects, the Rx UE 410 may receive an indication of a duration (e.g. a time period, a length of time, and/or the like) of use of the resource allocation associated with the received slice identifier. In this case, the Rx UE 410 may reschedule and/or prevent scheduling of communications, as described above, on resources of the resource allocation for the indicated duration. In some aspects, the Rx UE 410 may use a pre-configured, a standardized, or a well-known value for such a duration if it does not receive such an indication.

In some aspects, the Rx UE 410 may reconfigure one or more slices (e.g., resource allocations) used for service types that do not correspond to the received slice identifiers. For example, the Rx UE 410 may reduce a size of such a slice (e.g., by reducing the number of resources included in a resource allocation corresponding to the slice). In some aspects, the Rx UE 410 may equally reduce a size of all slices that do not correspond to the received slice identifiers. Alternatively, the Tx UE 405 and/or a base station 110 may indicate a manner in which one or more slices are to be adjusted, and the Rx UE 410 may adjust a resource allocation of the one or more slices accordingly.

In some aspects, the Rx UE 410 may adjust one or more slices using a rule-based prioritization of slices. For example, different slices may be associated with different priority levels, and such priority levels may be used to determine a manner in which the slices are adjusted. For example, the Rx UE 410 may reduce a size of the lowest priority slice being used by the Rx UE 410 until the resource allocation corresponding to the received slice identifier(s) is satisfied. In some aspects, the size of the lowest priority slice may be reduced down to a minimum slice size for that slice, and a size of a next-lowest priority slice may be reduced, and so on, until the resource allocation corresponding to the received slice identifier(s) is satisfied. In some aspects, the prioritization may indicate a set of weight values to be applied to reduce the size of multiple slices, where a higher weight value applied to a slice results in more resources or a higher percentage of resources being removed from that slice as compared to another slice with a lower weight value.

In some aspects, the Rx UE 410 may determine the resource allocation corresponding to the received slice identifier based at least in part on a data structure, as described above. Additionally, or alternatively, the Rx UE 410 may determine the resource allocation based at least in part on an indication received from a base station 110 (e.g., in an RRC message, a SIB, and/or the like), as described in more detail below in connection with FIG. 5.

In some aspects, the slice identifier may indicate (e.g., implicitly) a capability of the Tx UE 405, and the Rx UE 410 may infer the capability based at least in part on the slice identifier. In some aspects, the Rx UE 410 may communicate with the Tx UE 405 based at least in part on the capability, which may conserve network resources as compared to explicitly indicating a capability and/or performing a capability exchange procedure.

By slicing resources of a sidelink channel (e.g., the PSSCH and/or the like) in this manner, resource usage and spectral efficiency may be improved. For example, if a service type is not being used in a particular area, then resources that would otherwise be reserved for that service type may be reallocated to other services. Furthermore, such slicing of resources may assist with improving performance and/or meeting communication requirements of various services. For example, if a service type with particular requirements is being used in a particular area, then resources can be reserved for communications of that service type such that the particular requirements can be satisfied.

As indicated above, FIG. 4 is provided as an example. Other examples may differ from what is described with respect to FIG. 4.

Figure 5:
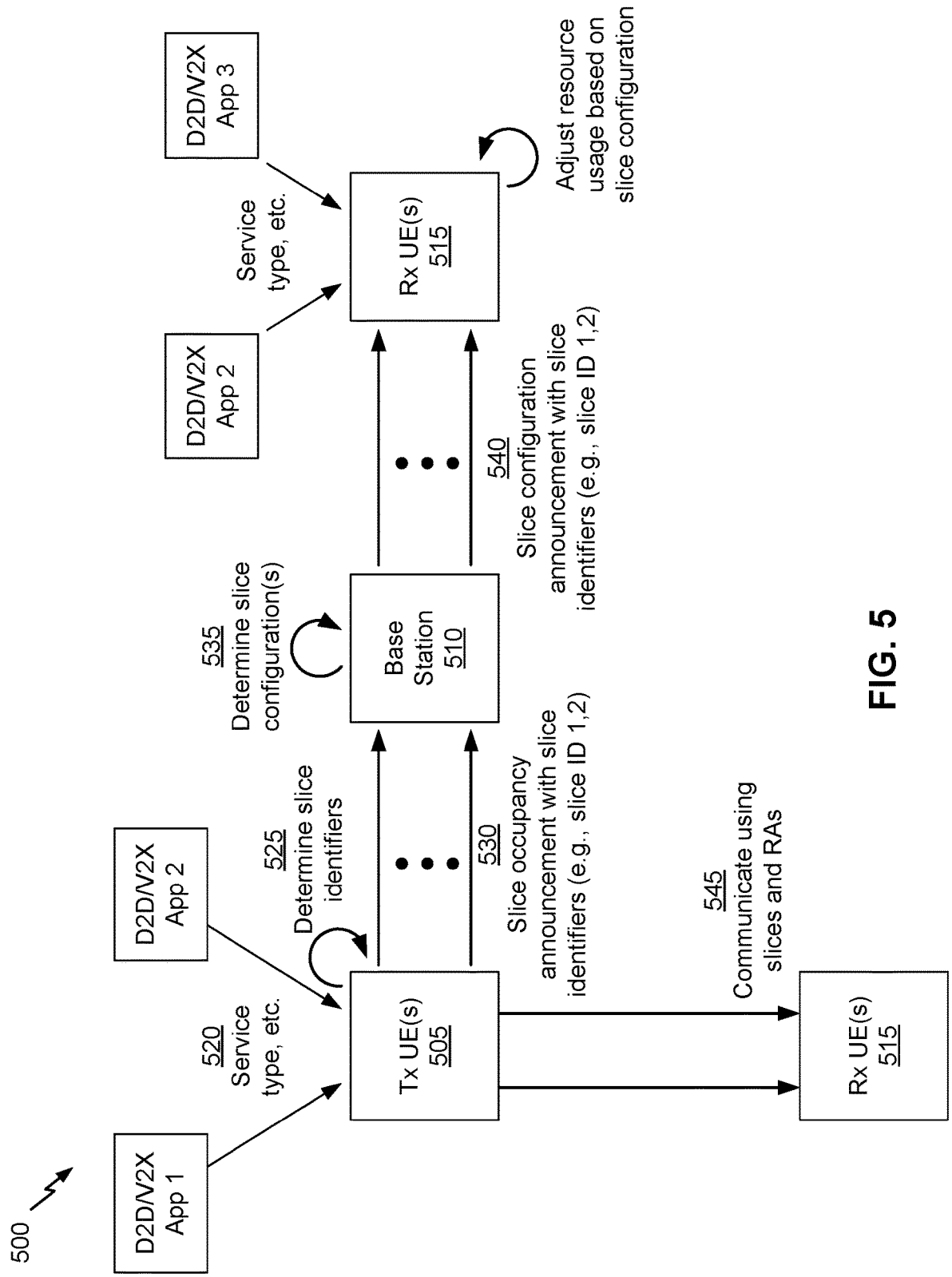

FIG. 5 is a diagram illustrating another example 500 of resource slicing on a sidelink interface, in accordance with various aspects of the present disclosure.

As shown in FIG. 5, a transmitter (Tx) UE 505 may communicate with a base station 510 and/or one or more receiver (Rx) UEs 515. A Tx UE 505 and/or an Rx UE 515 may correspond to one or more UEs described elsewhere herein, such as UE 120, UE 305, Tx UE 405, Rx UE 410, and/or the like. As described above in connection with FIG. 4, a single UE (e.g., UE 120) may be capable of operating as a transmitter UE 505 (e.g., that transmits D2D communications to other UEs) and a receiver UE 515 (e.g., that receives D2D communications from other UEs). The base station 510 may correspond to one or more base stations described elsewhere herein, such as base station 110 and/or the like. In some aspects, the base station 510 may support a centralized unit (CU)-distributed unit (DU) architecture, a Cloud-RAN architecture, and/or the like. In some aspects, a UE 505, 515 may be integrated into a vehicle, may be located in or on the vehicle, may be associated with a vehicle, may be associated with infrastructure, may be associated with a pedestrian, and/or the like. The Tx UE 505 and the Rx UE 515 may communicate via one or more sidelink channels 310. The Tx UE 505 and the base station 510 may communicate via one or more uplink channels and/or downlink channels. Similarly, the Rx UE 515 and the base station 510 may communicate via one or more uplink channels and/or downlink channels.

As shown by reference number 520, the Tx UE 505 may determine a service type to be used by the Tx UE 505 for one or more D2D communications on a sidelink interface, one or more QoS parameters associated with a D2D application and/or the service type, one or more transmission characteristics associated with the D2D application and/or the service type, and/or the like, in a similar manner as described above in connection with FIG. 4.

As shown by reference number 525, the Tx UE 505 may determine a slice identifier based at least in part on the service type, as described above in connection with FIG. 4.

As shown by reference number 530, the Tx UE 505 may transmit, and the base station 510 may receive, an indication of the slice identifier, in a similar manner as described above in connection with FIG. 4, except that FIG. 4 depicts transmission of the indication directly to the Rx UE 515, rather than the base station 510. In some aspects, the slice identifier may be indicated to the base station 510 in an RRC message and/or the like.

As shown by reference number 535, the base station 510 may determine one or more slice configurations for one or more resource slices of the sidelink channel based at least in part on the indication of the slice identifier received from the Tx UE 505 and/or other indications of slice identifiers received from other UEs. A slice configuration may include, for example, a resource allocation for a slice, a time period (e.g., a duration, a length of time, and/or the like) for which the resource allocation is to be used for the slice, a size of the slice (e.g., a number of resources in the resource allocation), and/or the like. In some aspects, the base station 510 may determine the resource allocation based at least in part on a data structure that maps different resource allocations to corresponding slice identifiers, as described above. Additionally, or alternatively, the base station 510 may determine the resource allocation based at least in part on information (e.g., slice occupancy announcements, slice identifiers, and/or the like) received from a plurality of UEs 120 within a coverage area of the base station 510.

In some aspects, the base station 510 may determine slice configurations for multiple slices based at least in part on whether any UEs 120 request a particular slice type, a number of UEs 120 that request a particular slice type, a priority associated with a slice type, one or more requirements associated with a slice type, a network condition associated with the base station 510 (e.g., a network load, a channel quality, and/or the like). For example, if a slice type is not requested by any UE 120, then the base station 510 may not allocate any resources for that slice type (e.g., until the base station 510 receives a request for the slice type). Additionally, or alternatively, if a large number of UEs 120 request a slice type, then the base station 510 may allocate more resources for that slice type as compared to a slice type requested by a small number of UEs 120. Additionally, or alternatively, the base station 510 may allocate more resources for a higher priority slice type as compared to a lower priority slice type, may allocate more resources for slice types associated with more stringent requirements (e.g., higher reliability, lower latency, better QoS, and/or the like) as compared to slice types associated with less stringent requirements, and/or the like.

As shown by reference number 540, the base station 510 may indicate a slice identifier (e.g., in a slice configuration announcement, an RRC message, a SIB, and/or the like), received from the Tx UE 505, to the Rx UE 515. In this case, the Rx UE 515 may adjust resource usage based at least in part on the slice identifier, as described above in connection with FIG. 4. In some aspects, the base station 510 may indicate multiple slice identifiers aggregated from one or more Tx UEs 505, and may transmit the multiple slice identifiers to one or more Rx UEs 515. In some aspects, the Rx UEs 515 may determine resource allocation(s) corresponding to the indicated slice identifier(s), as described above in connection with FIG. 4. Additionally, or alternatively, the base station 510 may indicate the resource allocation(s) to the Rx UEs 515 (e.g., in the slice configuration announcement). Additionally, or alternatively, the base station 510 may indicate one or more slice configurations to the Rx UEs 515 (e.g., a resource allocation for a slice, a time period for which the resource allocation is to be used for the slice, a size of the slice, and/or the like).

In some aspects, the base station 510 may instruct the Rx UEs 515 to adjust resource usage, to reschedule D2D communications scheduled on non-corresponding resource allocations, to prevent transmission of D2D communications on non-corresponding resource allocations, and/or the like. An Rx UE 515 may perform one or more of these operations, as described in more detail in connection with FIG. 4, based at least in part on the instruction received by the base station 510. Additionally, or alternatively, the Rx UE 515 may autonomously perform one or more of these operations without an explicit instruction from the base station 510, in a similar manner as described above in connection with FIG. 4.

As shown by reference number 545, Tx UEs 505 and Rx UEs 515 may communicate using the determined resource allocations, which may be dynamically configured and/or adjusted over time. By slicing resources of a sidelink channel (e.g., the PSSCH and/or the like) in this manner, resource usage and spectral efficiency may be improved. Furthermore, such slicing of resources may assist with improving performance and/or meeting communication requirements of various services.

As indicated above, FIG. 5 is provided as an example. Other examples may differ from what is described with respect to FIG. 5.

Figure 6:
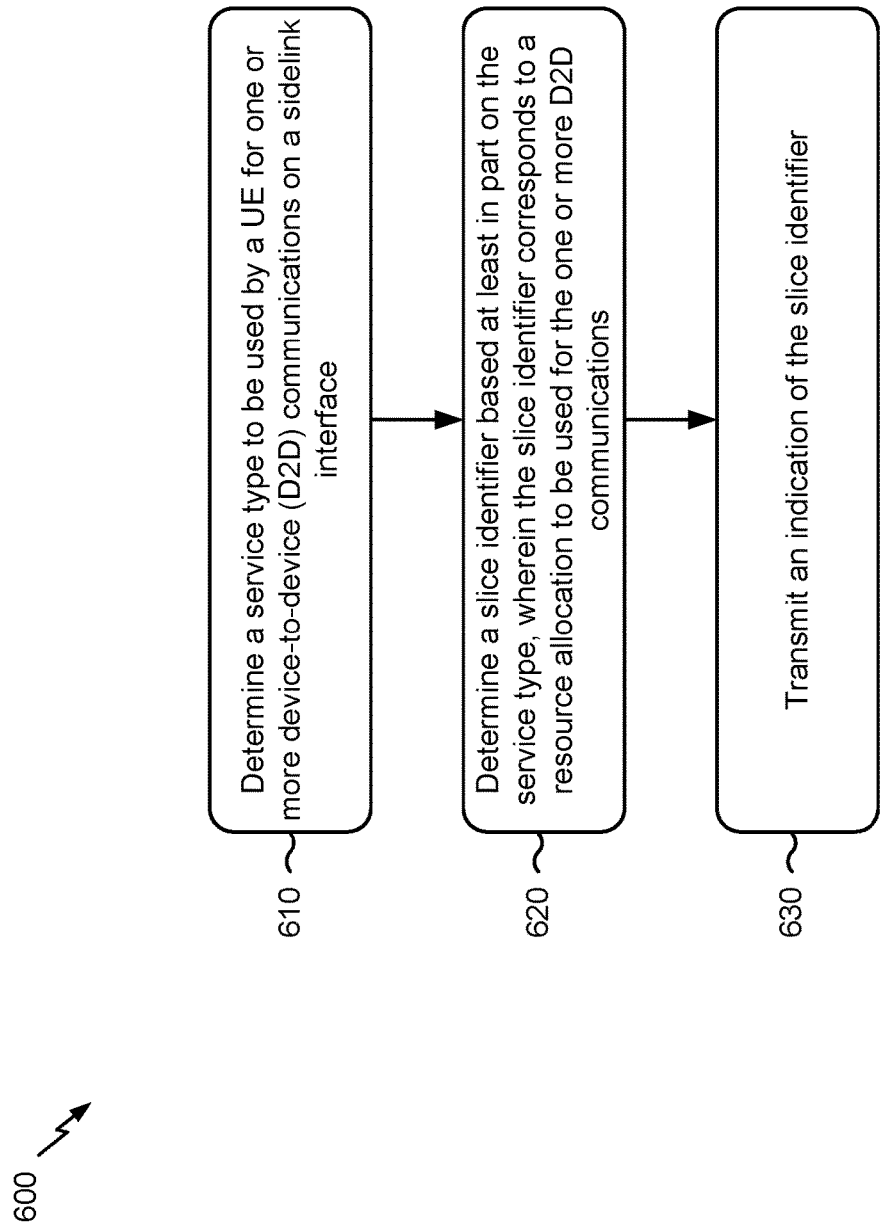
FIGS. 6-8 are diagrams illustrating example processes associated with resource slicing on a sidelink interface, in accordance with various aspects of the present disclosure.

FIG. 6 is a diagram illustrating an example process 600 performed, for example, by a UE, in accordance with various aspects of the present disclosure. Example process 600 is an example where a UE (e.g., UE 120 and/or the like) performs operations associated with resource slicing on a sidelink interface.

As shown in FIG. 6, in some aspects, process 600 may include determining a service type to be used by the UE for one or more device-to-device (D2D) communications on a sidelink interface (block 610). For example, the UE (e.g., using controller/processor 280 and/or the like) may determine a service type to be used by the UE for one or more D2D communications on a sidelink interface, as described above in connection with FIGS. 4-5.

As further shown in FIG. 6, in some aspects, process 600 may include determining a slice identifier based at least in part on the service type, wherein the slice identifier corresponds to a resource allocation to be used for the one or more D2D communications (block 620). For example, the UE (e.g., using controller/processor 280 and/or the like) may determine a slice identifier based at least in part on the service type, as described above in connection with FIGS. 4-5. In some aspects, the slice identifier corresponds to a resource allocation to be used for the one or more D2D communications.

As further shown in FIG. 6, in some aspects, process 600 may include transmitting an indication of the slice identifier (block 630). For example, the UE (e.g., using controller/processor 280, transmit processor 264, TX MIMO processor 266, MOD 254, antenna 252, and/or the like) may transmit an indication of the slice identifier, as described above in connection with FIGS. 4-5.

Process 600 may include additional aspects, such as any single aspect or any combination of aspects described below and/or in connection with one or more other processes described elsewhere herein.

In a first aspect, the slice identifier is further determined based at least in part on a set of quality of service parameters associated with the service type. In a second aspect, alone or in combination with the first aspect, the service type includes at least one of a location-based service, an intersection assist service, a platooning service, a cooperative adaptive cruise control service, a sensor sharing service, or a combination thereof. In a third aspect, alone or in combination with one or more of the first and second aspects, the resource allocation is determined based at least in part on a data structure that maps different resource allocations to corresponding slice identifiers or service type identifiers. In a fourth aspect, alone or in combination with one or more of the first through third aspects, the data structure is pre-configured on the UE, provisioned for the UE, or dynamically configured for the UE based at least in part on an indication received from a base station. In a fifth aspect, alone or in combination with one or more of the first through fourth aspects, the resource allocation is determined based at least in part on an indication received from a base station in connection with transmitting the indication of the slice identifier. In a sixth aspect, alone or in combination with one or more of the first through fifth aspects, the indication from the base station is received in a radio resource control (RRC) message or a system information block.

In a seventh aspect, alone or in combination with one or more of the first through sixth aspects, the UE may communicate using a set of resources of the resource allocation. In an eighth aspect, alone or in combination with one or more of the first through seventh aspects, the slice identifier indicates at least one of a slice type associated with the service type, a sub-slice type associated with the service type, a slice instance associated with the service type, or a combination thereof. In a ninth aspect, alone or in combination with one or more of the first through eighth aspects, the UE may indicate a requested duration for use of a slice identified by the slice identifier, a requested slice size associated with the slice identifier, or a combination thereof.

In a tenth aspect, alone or in combination with one or more of the first through ninth aspects, the indication of the slice identifier is transmitted in at least one of a non-access stratum (NAS) message over the sidelink interface, a radio resource control (RRC) message to a UE, an RRC message to a base station, a header of a D2D communication, or a combination thereof. In an eleventh aspect, alone or in combination with one or more of the first through tenth aspects, the slice identifier is determined based at least in part on a data structure that maps different slice identifiers to corresponding service type identifiers. In a twelfth aspect, alone or in combination with one or more of the first through eleventh aspects, the service type is represented using at least one of an upper layer identifier, a provider service identifier (PSID), an intelligent transport system application identifier (ITS-AID), or a combination thereof. In a thirteenth aspect, alone or in combination with one or more of the first through twelfth aspects, the service type is represented by an identifier that is not readable at an access stratum layer, and wherein the slice identifier is readable at the access stratum layer.

In a fourteenth aspect, alone or in combination with one or more of the first through thirteenth aspects, the indication of the slice identifier further indicates a permitted quality of service upgrade, a permitted quality of service downgrade, or a quality of service migration path. In a fifteenth aspect, alone or in combination with one or more of the first through fourteenth aspects, the indication of the slice identifier further indicates a capability of the UE. In a sixteenth aspect, alone or in combination with one or more of the first through fifteenth aspects, the capability includes at least one of a maximum transmission power, a modulation capability, a transmit diversity capability, a carrier aggregation capability, or a combination thereof. In a seventeenth aspect, alone or in combination with one or more of the first through sixteenth aspects, the one or more D2D communications include one or more V2X communications.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
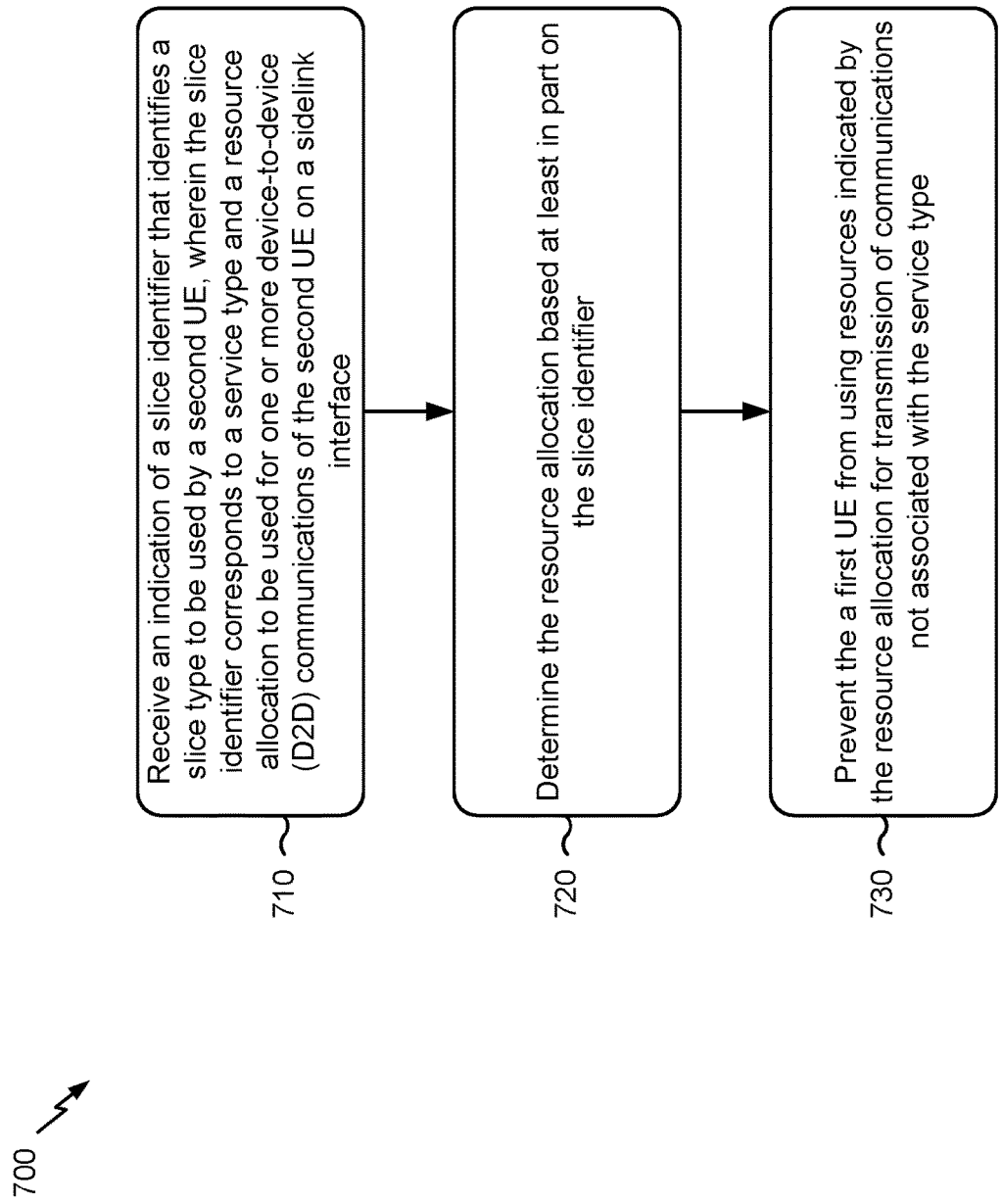

FIG. 7 is a diagram illustrating an example process 700 performed, for example, by a UE (e.g., a first UE), in accordance with various aspects of the present disclosure. Example process 700 is an example where a first UE (e.g., UE 120 and/or the like) performs operations associated with resource slicing on a sidelink interface.

As shown in FIG. 7, in some aspects, process 700 may include receiving an indication of a slice identifier that identifies a slice type to be used by a second UE, wherein the slice identifier corresponds to a service type and a resource allocation to be used for one or more device-to-device (D2D) communications of the second UE on a sidelink interface (block 710). For example, the first UE (e.g., using antenna 252, DEMOD 254, MIMO detector 256, receive processor 258, controller/processor 280, and/or the like) may receive an indication of a slice identifier that identifies a slice type to be used by a second UE, as described above in connection with FIGS. 4-5. In some aspects, the slice identifier corresponds to a service type and a resource allocation to be used for one or more D2D communications of the second UE on a sidelink interface.

As further shown in FIG. 7, in some aspects, process 700 may include determining the resource allocation based at least in part on the slice identifier (block 720). For example, the first UE (e.g., using controller/processor 280 and/or the like) may determine the resource allocation based at least in part on the slice identifier, as described above in connection with FIGS. 4-5.

As further shown in FIG. 7, in some aspects, process 700 may include preventing the first UE from using resources indicated by the resource allocation for transmission of communications not associated with the service type (block 730). For example, the first UE (e.g., using antenna 252, DEMOD 254, MIMO detector 256, receive processor 258, controller/processor 280, and/or the like) may prevent the first UE from using resources indicated by the resource allocation for transmission of communications not associated with the service type, as described above in connection with FIGS. 4-5.

Process 700 may include additional aspects, such as any single aspect or any combination of aspects described below and/or in connection with one or more other processes described elsewhere herein.

In a first aspect, the indication is received from at least one of the second UE, a base station, or a combination thereof. In a second aspect, alone or in combination with the first aspect, the resource allocation is determined based at least in part on a data structure that maps different resource allocations to corresponding slice identifiers. In a third aspect, alone or in combination with one or more of the first and second aspects, the data structure is pre-configured on the first UE, provisioned for the first UE, or dynamically configured for the first UE based at least in part on an indication received from a base station. In a fourth aspect, alone or in combination with one or more of the first through third aspects, the resource allocation is determined based at least in part on an indication received from a base station. In a fifth aspect, alone or in combination with one or more of the first through fourth aspects, the indication from the base station is received in a radio resource control (RRC) message or a system information block.

In a sixth aspect, alone or in combination with one or more of the first through fifth aspects, the indication of the slice identifier is received in at least one of a non-access stratum (NAS) message over the sidelink interface, a radio resource control (RRC) message from the second UE, an RRC message from a base station, a header of a D2D communication, or a combination thereof. In a seventh aspect, alone or in combination with one or more of the first through sixth aspects, the indication of the slice identifier further indicates a capability of the second UE. In an eighth aspect, alone or in combination with one or more of the first through seventh aspects, the capability includes at least one of a maximum transmission power, a modulation capability, a transmit diversity capability, a carrier aggregation capability, or a combination thereof. In a ninth aspect, alone or in combination with one or more of the first through eighth aspects, the first UE may communicate with the second UE based at least in part on the capability. In a tenth aspect, alone or in combination with one or more of the first through ninth aspects, the first UE is prevented from using the resources indicated by the resource allocation based at least in part on a rule-based prioritization of slices or slice types, an instruction received from the second UE, an instruction received from a base station, or a combination thereof. In an eleventh aspect, alone or in combination with one or more of the first through tenth aspects, the one or more D2D communications include one or more V2X communications.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
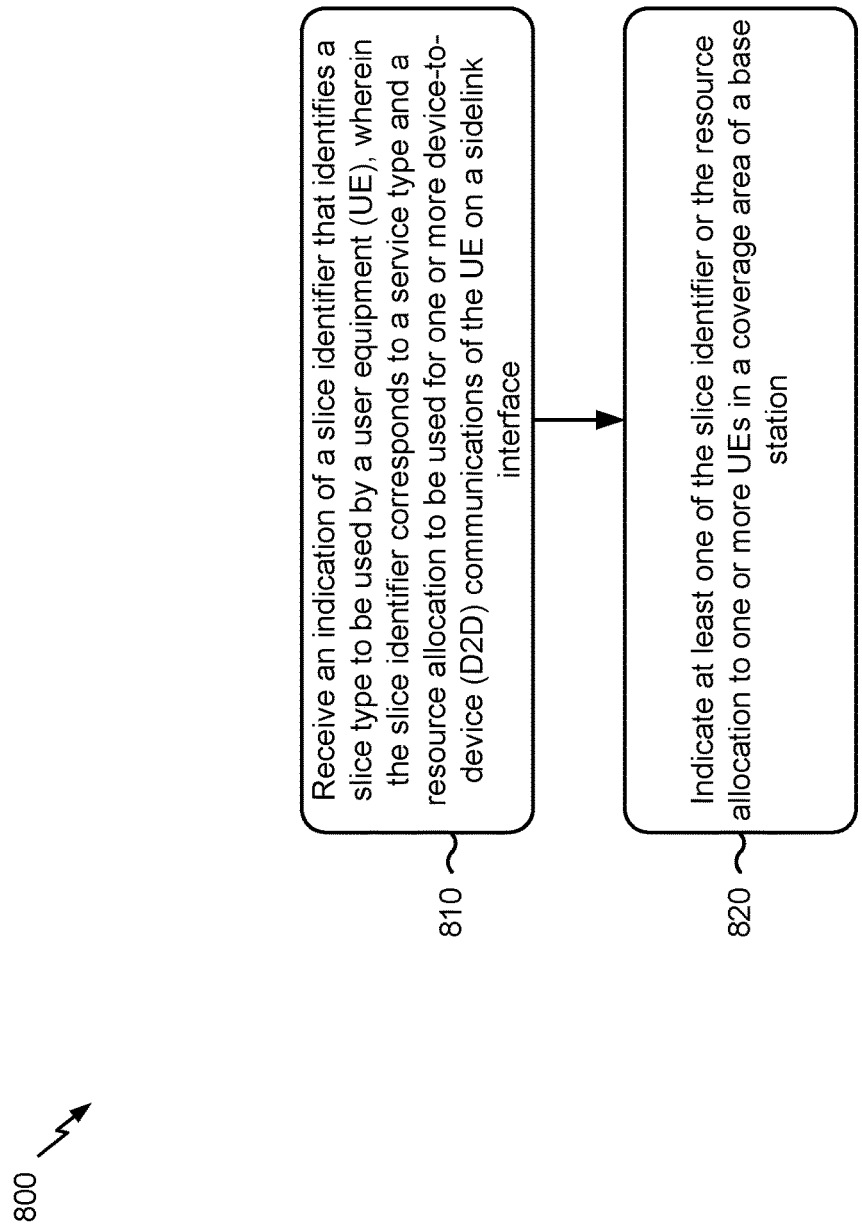

FIG. 8 is a diagram illustrating an example process 800 performed, for example, by a base station, in accordance with various aspects of the present disclosure. Example process 800 is an example where a base station (e.g., base station 110 and/or the like) performs operations associated with resource slicing on a sidelink interface.

As shown in FIG. 8, in some aspects, process 800 may include receiving an indication of a slice identifier that identifies a slice type to be used by a UE, wherein the slice identifier corresponds to a service type and a resource allocation to be used for one or more D2D communications of the UE on a sidelink interface (block 810). For example, the base station (e.g., using antenna 234, DEMOD 232, MIMO detector 236, receive processor 238, controller/processor 240, and/or the like) may receive an indication of a slice identifier that identifies a slice type to be used by a UE, as described above in connection with FIG. 5. In some aspects, the slice identifier corresponds to a service type and a resource allocation to be used for one or more D2D communications of the UE on a sidelink interface.

As further shown in FIG. 8, in some aspects, process 800 may include indicating at least one of the slice identifier or the resource allocation to one or more UEs in a coverage area of the base station (block 820). For example, the base station (e.g., using controller/processor 240, transmit processor 220, TX MIMO processor 230, MOD 232, antenna 234, and/or the like) may indicate at least one of the slice identifier or the resource allocation to one or more UEs in a coverage area of the base station, as described above in connection with FIG. 5.

Process 800 may include additional aspects, such as any single aspect or any combination of aspects described below and/or in connection with one or more other processes described elsewhere herein.

In a first aspect, the base station may instruct the one or more UEs not to use resources indicated by the resource allocation for transmission of communications not associated with the service type. In a second aspect, alone or in combination with the first aspect, the resource allocation is determined based at least in part on a data structure that maps different resource allocations to corresponding slice identifiers. In a third aspect, alone or in combination with one or more of the first and second aspects, the indication of the slice identifier is received in a radio resource control (RRC) message. In a fourth aspect, alone or in combination with one or more of the first through third aspects, the indication of the slice identifier further indicates at least one of a sub-slice type associated with the service type, a slice instance associated with the service type, a duration for which use of the slice type is requested, a requested slice size associated with the slice type, a location of the UE, or a combination thereof.

In a fifth aspect, alone or in combination with one or more of the first through fourth aspects, the base station may determine the resource allocation for the slice type based at least in part on information received from a plurality of UEs regarding requested slice types. In a sixth aspect, alone or in combination with one or more of the first through fifth aspects, the base station may indicate at least one of a time period or a length of time for which the resource allocation is to be used for the slice type. In a seventh aspect, alone or in combination with one or more of the first through sixth aspects, the one or more D2D communications include one or more V2X communications.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term component is intended to be broadly construed as hardware, firmware, or a combination of hardware and software. As used herein, a processor is implemented in hardware, firmware, and/or a combination of hardware and software.

As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or combinations of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
    determining a device-to-device (D2D) service type to be used by the UE for one or more D2D communications on a sidelink interface based at least in part on information received from a D2D application executing on the UE,
        wherein the information identifies one or more quality of service parameters associated with the D2D application;
    determining a slice identifier based at least in part on the D2D service type,
        wherein the slice identifier corresponds to a resource allocation of the sidelink interface and/or a sidelink channel to be used for the one or more D2D communications,
            wherein the resource allocation is determined based at least in part on a data structure, stored in a memory of the UE, that maps different resource allocations to corresponding slice identifiers or D2D service type identifiers; and
    transmitting an indication of the slice identifier.

2. The method of claim 1, wherein the one or more D2D communications include one or more vehicle-to-everything (V2X) communications.

3. The method of claim 1, wherein the D2D service type is represented using at least one of an upper layer identifier, a provider service identifier (PSID), or an intelligent transport system application identifier (ITS-AID).

4. The method of claim 1, wherein the data structure is pre-configured on the UE or provisioned for the UE.

5. The method of claim 1, further comprising communicating using a set of resources of the resource allocation.

6. The method of claim 1, wherein the slice identifier indicates at least one of a slice type associated with the D2D service type, a sub-slice type associated with the D2D service type, or a slice instance associated with the D2D service type.

7. The method of claim 1, further comprising indicating a requested duration for use of a slice identified by the slice identifier, a requested slice size associated with the slice identifier, or a combination thereof.

8. The method of claim 1, wherein the indication of the slice identifier is transmitted in at least one of a non-access stratum (NAS) message over the sidelink interface, a radio resource control (RRC) message to another UE, an RRC message to a base station, or a header of a D2D communication.

9. The method of claim 1, wherein the data structure maps different slice identifiers to corresponding D2D service type identifiers.

10. The method of claim 1, wherein the D2D service type includes at least one of a location-based service, an intersection assist service, a platooning service, a cooperative adaptive cruise control service, or a sensor sharing service.

11. The method of claim 1, wherein the D2D service type is represented by an identifier that is not readable at an access stratum layer, and wherein the slice identifier is readable at the access stratum layer.

12. The method of claim 1, wherein the indication of the slice identifier further indicates a permitted quality of service upgrade, a permitted quality of service downgrade, or a quality of service migration path.

13. The method of claim 1, wherein the indication of the slice identifier further indicates a capability of the UE.

14. A method of wireless communication performed by a first user equipment (UE), comprising:
  receiving an indication of a slice identifier that identifies a slice type to be used by a second UE,
    wherein the slice identifier corresponds to a device-to-device (D2D) service type and a resource allocation of a sidelink interface and/or a sidelink channel to be used for one or more D2D communications of the second UE on the sidelink interface,
      wherein the resource allocation is based at least in part on a data structure, stored in a memory of the second UE, that maps different resource allocations to corresponding slice identifiers or D2D service type identifiers;
  determining the D2D service type based at least in part on information received from a D2D application executing on the first UE,
    wherein the information identifies one or more quality of service parameters associated with the D2D application;
  determining the resource allocation based at least in part on the slice identifier; and
  preventing the first UE from using resources indicated by the resource allocation for transmission of communications not associated with the D2D service type.

15. The method of claim 14, wherein the one or more D2D communications include one or more vehicle-to-everything (V2X) communications.

16. The method of claim 14, wherein the indication is received from at least one of the second UE or a base station.

17. The method of claim 14, wherein the data structure is pre-configured on the second UE or provisioned for the second UE.

18. The method of claim 14, wherein the resource allocation is determined based at least in part on an indication received from a base station.

19. The method of claim 18, wherein the indication received from the base station is received in a radio resource control (RRC) message or a system information block.

20. The method of claim 14, wherein the indication of the slice identifier is received in at least one of a non-access stratum (NAS) message over the sidelink interface, a radio resource control (RRC) message from the second UE, an RRC message from a base station, or a header of a D2D communication.

21. The method of claim 14, wherein the indication of the slice identifier further indicates a capability of the second UE.

22. The method of claim 21, further comprising communicating with the second UE based at least in part on the capability.

23. The method of claim 14, wherein the first UE is prevented from using the resources indicated by the resource allocation based at least in part on a rule-based prioritization of slices or slice types, an instruction received from the second UE, or an instruction received from a base station.

24. A method of wireless communication performed by a base station, comprising:
  receiving an indication of a slice identifier that identifies a slice type to be used by a user equipment (UE),
    wherein the slice identifier corresponds to a device-to-device (D2D) service type and a resource allocation of a sidelink interface and/or a sidelink channel to be used for one or more D2D communications of the UE on the sidelink interface,
      wherein the resource allocation is based at least in part on a data structure, stored in a memory of the UE, that maps different resource allocations to corresponding slice identifiers or D2D service type identifiers, and
      wherein the D2D service type is based at least in part on information from a D2D application executing on the UE,
        wherein the information identifies one or more quality of service parameters associated with the D2D application; and
  indicating at least one of the slice identifier or the resource allocation to one or more UEs in a coverage area of the base station.

25. A user equipment (UE) for wireless communication, comprising:
  memory; and
  one or more processors coupled to the memory, the memory and the one or more processors configured to:
    determine a device-to-device (D2D) service type to be used by the UE for one or more D2D communications on a sidelink interface based at least in part on information received from a D2D application executing on the UE,
      wherein the information identifies one or more quality of service parameters associated with the D2D application;
    determine a slice identifier based at least in part on the D2D service type, wherein the slice identifier corresponds to a resource allocation of the sidelink interface and/or a sidelink channel to be used for the one or more D2D communications,
 wherein the resource allocation is determined based at least in part on a data structure, stored in a memory of the UE, that maps different resource allocations to corresponding slice identifiers or D2D service type identifiers; and
transmit an indication of the slice identifier.

26. The UE of claim 25, wherein the one or more D2D communications include one or more vehicle-to-everything (V2X) communications.

27. The UE of claim 25, wherein the D2D service type is represented using at least one of an upper layer identifier, a provider service identifier (PSID), or an intelligent transport system application identifier (ITS-AID).

28. The UE of claim 25, wherein the one or more processors are further configured to:
communicate using a set of resources of the resource allocation.

29. The UE of claim 25, wherein the slice identifier indicates at least one of a slice type associated with the D2D service type, a sub-slice type associated with the D2D service type, or a slice instance associated with the D2D service type.

30. The UE of claim 25, wherein the one or more processors are further configured to:
indicate a requested duration for use of a slice identified by the slice identifier, a requested slice size associated with the slice identifier, or a combination thereof.

* * * * *